United States Patent [19]
Beck et al.

[11] 3,832,015
[45] Aug. 27, 1974

[54] CONTROL VALVE UNIT IN PNEUMATIC BRAKING SYSTEM

[75] Inventors: Siegfried Beck, Stuttgart; Manfred Siebold, Boblingen, both of Germany

[73] Assignee: Robert Bosch GmbH, Stuttgart, Germany

[22] Filed: Sept. 19, 1973

[21] Appl. No.: 398,772

[30] Foreign Application Priority Data
Sept. 21, 1972 Germany............................ 2246242

[52] U.S. Cl...................... 303/40, 303/6 C, 303/29
[51] Int. Cl............................................. B60t 15/02
[58] Field of Search............. 303/40, 7, 6 C, 29, 50, 303/52, 54, 9; 188/3 R, 349

[56] References Cited
UNITED STATES PATENTS

| | | | |
|---|---|---|---|
| 2,910,325 | 10/1959 | Price et al............................ | 303/40 |
| 3,275,381 | 9/1966 | Pfeifer.................................. | 303/40 |
| 3,411,836 | 11/1968 | Dobrikin et al...................... | 303/29 |
| 3,525,555 | 8/1970 | Meyer et al.......................... | 303/40 |

Primary Examiner—Trygve M. Blix
Assistant Examiner—D. C. Butler
Attorney, Agent, or Firm—Michael S. Striker

[57] ABSTRACT

A pneumatic braking system includes two first pneumatic braking circuits of a motor vehicle and a second pneumatic braking circuit of a trailer towed by the vehicle and which second braking circuit is to be controlled in dependence upon the operation of the first braking circuits. A control valve unit provides such control and has a housing an outlet of which communicates with the second circuit, and a chamber contains fluid at the pressure of a reservoir. A valve arrangement is displaceable between a first position in which it connects the outlet with the ambient atmosphere, a second position in which it disconnects the outlet from the ambient atmosphere, and a third position in which it connects the outlet with the aforementioned chamber to thereby pressurize the second circuit. A pair of first pistons are shiftable in the housing from a normal rest position to a operated position in response to pressurization of the first circuits during braking of the vehicle. A compound second piston controls the movements of the valve arrangement, and has one piston portion connected with the valve arrangement and shiftable in the housing to thereby displace the valve arrangement sequentially from the first to the second and then toward the third position in response to movement of at least one of the first pistons to the operated position thereof. The second piston also includes another piston portion which is biased away from the one piston portion and which has a surface communicating with the interior of the outlet so that when the second circuit is partially pressurized during movement of the valve arrangement from the second towards the third position and pressure in the outlet exceeds the biasing force, the other piston portion will move into abutment with the one piston portion to thereby slow the shifting of the same and the displacement of the valve arrangement towards the third position thereof.

11 Claims, 3 Drawing Figures

2

CONTROL VALVE UNIT IN PNEUMATIC BRAKING SYSTEM

BACKGROUND OF THE INVENTION

The present invention relates generally to a control valve unit and more particularly to a control valve unit for pneumatic braking systems. Still more especially the invention relates to a control valve unit for controlling the pressurization of the braking circuit of a trailer in dependence upon the pressurization of the dual braking circuits of a motor vehicle which tows the trailer, with the entire braking system being pneumatically operated.

It is well known that when a trailer is towed by a vehicle, and the braking system of vehicle and trailer is pneumatically operated, every operation of the vehicle brakes results in a concurrent operation of the trailer brakes. However, unless the trailer is at least initially braked more sharply than the vehicle itself, the trailer would tend to push against or "overrun" the vehicle, which can lead to jolting of the vehicle and possible damage to the hitch-connection between vehicle and trailer. It is also conceivable that under certain circumstances, for instance under slippery road conditions, this pushing might be sufficient for the vehicle to start skidding.

Ideally, therefore, the brakes of the trailer should be operated more shraply than those of the motor vehicle when the brakes of the motor vehicle are operated. This should, however, not continue until the braking incident has been terminated. Instead, the sharper operation of the trailer brakes should continue only for a certain period of time sufficient to prevent the possibility of pushing or overrunning of the vehicle by the trailer, and should be followed by a more gradual application of the trailer brakes in keeping with the operation of the vehicle brakes themselves.

Although the prior art has recognized the problem and has made an attempt to overcome it, the constructions known from the prior art are not satisfactory. Control valve units known from the prior art for the purpose here in question provide for a prolonged sharp application of the trailer brakes, and only after a relatively considerable time period has ellapsed after the application of the motor vehicle brakes, does the sharp application of the trailer brakes become converted into a less sharp, i.e., more gradual, application which is more in keeping with the application of the motor vehicle brakes. This prior art construction therefore, cannot provide for the possibility of controlling the operation of the trailer brake in accordance with the operation of the vehicle brakes after only a brief period of sharp application of the trailer brakes. This, however, is highly desirable in terms of improved control over the actions of the trailer, once the latter has initially been braked for a brief period of time and sharply enough to prevent pushing or overrunning of the vehicle.

SUMMARY OF THE INVENTION

It is, accordingly, an object of the present invention to overcome the disadvantages of the prior art.

A more particular object of the present invention is to provide a novel control unit in a pneumatic braking system which includes two pneumatic brake circuits of a motor vehicle and a pneumatic brake circuit of a trailer towed by the vehicle and which is to be controlled by the control valve unit.

Still more specifically, the invention has as one of its objects to provide such a control valve unit in which the pneumatic braking circuit of the trailer is so controlled by the control valve unit that the trailer will be sharply braked only for a brief period upon application of the brakes of the motor vehicle, and will then immediately be responsive to the more sensitive braking actions which are transmitted to it from the braking circuits of the motor vehicle.

In keeping with the above objects and with others which will become apparent hereafter, one feature of the invention resides in a pneumatic braking system which includes two first pneumatic braking circuits of a motor vehicle, and a second pneumatic braking circuit of a trailer towed by the vehicle, a control valve unit for controlling the pressurization of the second braking circuit in dependence upon the pressurization of the first braking circuits.

According to the invention, the control valve unit comprises a housing having an outlet communicating with the second circuit, and a chamber containing fluid at the pressure of a pressure-fluid reservoir. Valve means is displaceable between a first position connecting the outlet with the ambient atmosphere, a second position disconnecting the outlet from the ambient atmosphere, and a third position connecting the outlet with the chamber to thereby pressurize the second circuit. A pair of first pistons is shiftable in the housing from a rest position to an operated position in response to pressurization of the first circuits during braking of the vehicle. A compound second piston is provided for controlling the movements of the valve means. The second piston has one piston portion connected with the valve means and is shiftable in the housing to displace the valve means sequentially from the first to the second and then towards the third position thereof in response to movement of at least one of the first pistons to the operated position. The second piston also has another piston portion which is biased away from the one piston portion and which has a surface communicating with the interior of the outlet so that, when the second circuit is partially pressurized during movement of the valve means from the second towards the third position and pressure in the outlet exceeds the biasing force, the other piston portion moves into abutment with the one piston portion to thereby modify the shifting movement of the same and thus the displacement of the valve means towards the third position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE SPECIFIC EMBODIMENTS

Figure 1:
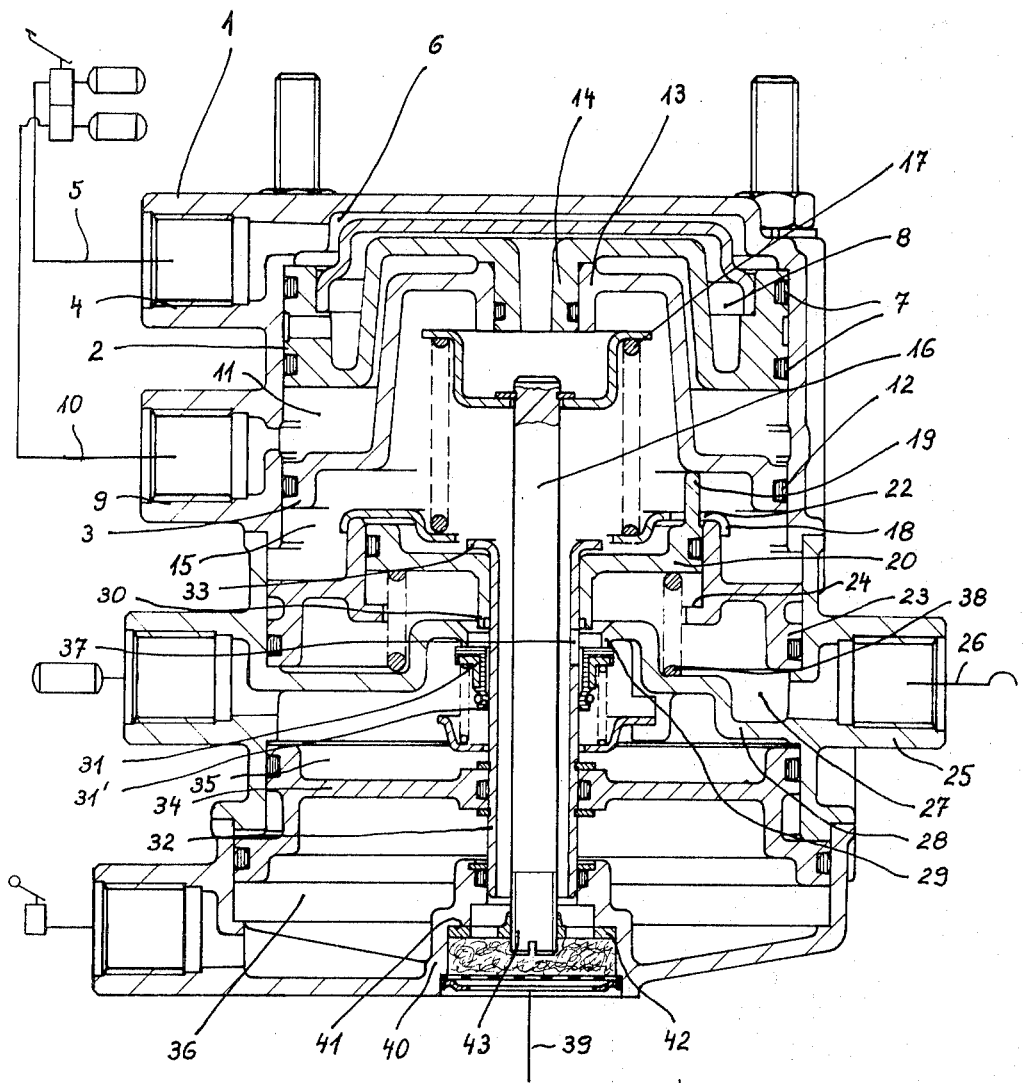
FIG. 1 is a somewhat diagrammatic axial section through a control valve according to one embodiment of the invention.
Figure 2:
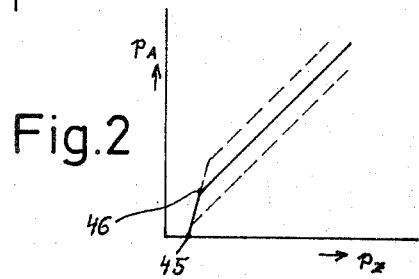
FIG. 2 is a diagram showing the manner in which pressurization of a trailer braking circuit is controlled by the valve unit of FIG. 1.

Discussing in the drawing firstly the embodiment which is illustrated in FIGS. 1 and 2, it will be seen that FIG. 1 shows a housing 1 in the interior of which there are mounted two braking pistons 2 and 3 of identical diameter. In the drawing, the pistons 2 and 3 are located at the upper end of the interior of the housing 1, being movable downwardly and upwardly therein. The housing 1 has an inlet 4 which is to be connected with the diagrammatically illustrated pneumatic braking circuit 5 and an inlet 9 which is to be connected with the diagrammatically illustrated pneumatic braking circuit 10. The circuits 5 and 10 are the dual pneumatic braking circuits of a motor vehicle which is to control the pneumatic braking circuit 26 of a trailer being towed by the vehicle and which braking circuit 26 is to be connected to the outlet 25 of the housing 1.

The inlet 4 communicates with a chamber 6 above the piston 2, which latter is provided with a double seal 7 in form of two axially consecutive axial sealing rings between which there is located a space 8 communicating with the ambient atmosphere. The inlet 9 communicates with a chamber 11 which is located between the pistons 2 and 3 so that the pressure fluid admitted via the inlet 9 can act in the chamber 11 both on the piston 2 and on the piston 3. The latter is provided only with a single ring seal 12 and has an upwardly extending hub portion 13 which can slide on a downwardly extending cylindrical projection 14 of piston 2. The hub portion 13 is sealed (as illustrated) with reference to the projection 14, which latter has a central passage, and can slide on the projection 13 in axial direction.

At the opposite side of the piston 3 from the chamber 11, that is downwardly thereof in FIG. 1, is provided a chamber 15 which is in communication with the ambient atmosphere and which accommodates a biasing spring 17, here a helical spring, which is pre-stressed by a tensioning rod 16, which carries at its other end the illustrated flange against which one axial end of the spring 17 abuts.

As will be described later, the tensioning rod 16 can be shifted axially, that is upwardly or downwardly in FIG. 1, whereby the pre-stressing of the spring 17 can be varied at the will of a user. The opposite (i.e. in FIG. 1 the lower) end of the spring 17 is supported on and bears against a plate 17 which is provided with a plurality of cutouts 22.

Downwardly of the plate 18 there is provided a compound piston having a piston portion 20 provided with axially upwardly extending projections 19 each of which extends through one of the cutouts 22, and a piston portion 23 into which the piston portion 20 is partially telescoped. The term "partially" refers to the fact that the projections 19 of the piston portion 20 project through the cutouts 22; they are in constant contact with one of the pistons 2, 3, in the illustrated embodiment with the piston 3, so when any motion of the piston 3 is transmitted to the piston portion 20 via the projections 19. Of course, inasmuch as the pistons 2 and 3 cooperate in a manner which will be described subsequently, the piston portion 20 is in effect in constant motion-transmitting or receiving contact with both of the pistons 2 and 3.

The diameter of the piston portion 20 is relatively small, and, as already pointed out earlier, the portion 20 is telescoped into and of course shiftable in the piston portion 23, which has a larger diameter and is provided with a shoulder 24 with which it can abut the piston portion 20 under the conditions which will be described later. The compound piston 20, 23 constitutes a movable wall of a chamber 27 which communicates with the interior of the outlets 25 and which has an opposite wall 28 which is a stationary part of the housing 1. An inlet valve seat 29 is provided in the wall 28, and an outlet valve seat 30 is provided on the piston portion 20. A valve body 31 constitues with the valve seats 29 and 30 a valve means; it is provided with a sealing lip 31' which engages a tubular guide 32 so that the valve body 31 can slide along the latter. The drawing shows the tubular valve 32 extends through the valve body 31 as well as valve seats 29 and 30. The inner end of the guide 32 is provided with a flange 33 which can move into engagement with the piston portion 20 of the compound piston 20, 23. A piston element 34 slidably surrounds the tubular guide 32 and has two surfaces which face in mutually opposite directions. One of these surfaces, namely the one which faces upwardly in FIG. 1, is exposed to the pressure in a chamber 35 which communicates in nonillustrated manner with a fluid-pressure reservoir of the pneumatic braking system and the downwardly directed face of the piston element is subjected to the pressure in a chamber 36 which communicates with a similarly non-illustrated emergency brake circuit, that is a fail-safe circuit which acts in the event the pneumatic system becomes inoperative.

The tubular guide 32 is provided in its circumferential wall with at least one opening 37 intermediate the valve seat 30 and the sealing lip 31'; the opening 37 communicates with the interior of the tubular guide 32 and thus with the ambient atmosphere, because the interior communicates with the ambient atmosphere; in addition the opening 27 communicates with the chamber 27 so that the latter can be at atmospheric pressure. Accommodated in the chamber 27 is a spring 38 which permanently biases the piston portion 20 of the compound piston 20, 23 away from the valve body 31, that is in upward direction in FIG. 1.

It is emphasized that although the piston element 34 is configurated as a stepped element, it could also be of non-stepped configuration combined with a spring element to obtain different piston forces.

Returning to the tension rod 16, it will be noted that the latter extends freely and with radial play through the tubular guide 32, being mounted on the housing 1 in the region of a socket wall 40 thereof so that it can be adjusted, that is it can be shifted axially up or down in FIG. 1. The socket bounded by wall 40 is to be connected with the conduit 39 (diagrammatically shown) which communicates with the ambient atmosphere so that the interior of the tubular guide 32 communicates with the ambient atmosphere. The adjustable mounting of the tension rod 16 is, in the embodiment of FIG. 1, obtained by accommodating a nut 42 which is located in the socket bounded by the wall 40 and abuts a shoulder 41 provided for this purpose. The nut 42 has a threaded end portion of the tension rod 16 threaded into it, and the tension rod has at its outer free end a slot (or other suitable means) for engagement by a tool so that the tension rod 16 can be turned, to thereby shift it axially of itself and an increase or decrease the prestressing of the spring 17. To assure that the nut 42 does not seal the interior of the tubular guide 32, against the ambient atmosphere, the nut 42 is provided with a plurality of openings as shown, through which communication exists.

In the operation of the embodiment shown in FIG. 1, the latter will be connected with the pneumatic braking system 5 and 10 of the motor vehicle, and with the pneumatic braking circuit 26 of the trailer which is to be towed by the motor vehicle. When the brakes of the motor vehicle are not operated, the braking circuits 5 and 10 as well as the braking circuit 26 are not under pressure. The two pistons 2 and 3 are in the illustrated upper end position or rest position, and the trailer braking circuit 26 is at the pressure of the ambient atmosphere, being connected with the same via the chamber 27, the open valve 30, 31, the opening 37 and the tubular guide 32. In this condition, the brakes of the trailer, are, of course, also not actuated.

If, now, the brakes of the motor vehicle are operated, and assuming that both of the circuits 5 and 10 are in working order, then the circuits 5 and 10 are both pressurized, via the inlets 4 and 9, the chambers 6 and 11 are similarly pressurized. Since both of the opposite piston surfaces of the piston 2 are thus subjected to pressure, the piston 2 remains in its illustrated position, whereas the piston 3 moves downwardly under the influence of the pressure acting on it in the chamber 11. In this case, it is therefore the piston 3 which controls the operation of the trailer braking circuit 26.

Assuming that the braking circuit 5 of the vehicle should become defective, then this will not change the aforementioned operation that is the piston 2 will remain in its position shown in FIG. 1, and only the piston 3 will move to control the operation of the trailer braking circuit 26.

If, on the other hand, the braking circuit 10 communicating with the inlet 9 should become defective, and only the braking circuit 5 should be operative, then pressure is applied only into the chamber 6, and this causes the piston 2 to move downwardly in FIG. 1. During such movement of piston 2 of course shifts the piston 3 along with it in downward direction, and it is thus the piston 2 which controls the operation of the trailer braking circuit 26 under these circumstances.

Irrespective of which of the aforementioned conditions obtains, the axial displacement of the respective piston 2 or 3 is transmitted via the projections 19 to the piston portion 20 of the compound piston 20, 23. This causes the piston portion 20, to be moved in opposition to the force of the spring 38 (i.e. downwardly in FIG. 1) towards the valve body 31 until it engages the latter with the valve seat 30. Whereas the first position of the valve means was the position shown in FIG. 1 in which the chamber 27 is in communication with the ambient atmosphere, the valve means has now assumed its second position in which the outlet valve composed of the valve seat 30 and the valve member 31 closes, whereby the communication between the chamber 27 and the ambient atmosphere is terminated, thereby similarly terminating the communication of the trailer braking circuit 26 with the ambient atmosphere.

As the piston or pistons 2, 3 continue to move downwardly, and the piston portion 20 is moved in the same sense, the valve body 31 is now moved out of engagement with the inlet valve seat 29, thereby opening the inlet valve 29, 31. In this third position of the valve means, compressed air which is received in the chamber 35 from the non-illustrated reservoir can enter into the chamber 27 and from there via the outlet 25 into the trailer braking circuit 26, pressurizing the same.

FIG. 2 shows diagrammatically how this pressurization takes place. The pressure in the trailer braking circuit 26 is designated with character PA on the ordinate, and the pressure in the braking circuits 5 and 10 of the motor vehicle is designated with characters PZ and plotted on the abscissa. The point designated with reference numeral 45 in FIG. 2 represents the point at which the valve 29, 31 has just opened, as described above. From this point on, the pressure in the circuit 27 rises very rapidly until it reaches the point 46, the purpose being to make the brakes of the trailer with which the braking circuit 26 cooperate respond quickly. The pressure increase curve changes, however, once the point 46 is reached, and a further pressure increase is much less rapid and will be seen to be plotted on a line which is inclined at only approximately 45°. In other words, from point 46 on the very rapid increase of pressure in the circuit 26 is terminated, and the further pressure increase corresponds to the pressure increase which takes place in the braking circuits 5 and 10 of the motor vehicle.

The termination of the rapid pressure increase once the point 46 is reached, is achieved in that the pressure in the circuit 26 and the chamber 27 also acts upon the piston portion 23. Once the pressure in the circuit 26 and the chamber 27 has reached sufficient force to overcome the force of the biasing spring 17 which opposes it, the piston portion 23 is displaced upwardly until its shoulder 24 abuts the piston portion 20. This movement is, of course, terminated when this abutment takes place and due to the fact that the piston 20, 23 is a compound piston having the two portions 20 and 23, the desired regulation of the braking effect in this initial braking phase is achieved, that is the trailer is braked very hard only during the pressure increase from point 45 to point 46 in FIG. 2, and thereafter its braking is under the precise control of the brake pedal in the motor vehicle which controls the braking circuits 5 and 10.

The position of point 46 in FIG. 2 can be changed, thereby change the initial rapid braking of the trailer. To achieve this, it is merely necessary to turn the tension rod 16 so that it moves upwardly or downwardly in FIG. 1, thereby changing the pre-stress of the spring 17; this makes it possible to obtain pressure curves such as those which are shown in broken lines of FIG. 2, instead of the full line one.

Once the shoulder 24 of the piston portion 23 abuts the piston portion 20, the compound piston 20, 23 operates as if it were of one piece and, as pointed out before, the braking pressures in the circuits 5 and 10 are now transmitted by the large-surface compound piston 20, 23 into the circuit 26 so that the braking of the trailer can be controlled with the amount of precision as the braking of the motor vehicle itself via the circuit 5 and 10.

The same control is effective even if the emergency circuit communicating with the chamber 26 is vented for braking purposes. When the pressure in the chamber 36 drops, the pressure in the chamber 35 will push the piston element 34 downwardly in FIG. 1, forcing the tubular guide 32 which is fixedly connected with the piston element 34 to perform the same movement.

In turn, the flange 33 of the tubular guide 32 pulls down the piston portion 20 and the valve seat 30 thereof, so that the double valve means 29, 30, 31 switches and the trailer braking circuit 26 becomes pressurized. Here, also, the counterpressure in the chamber 27 permits a precise control of the braking pressure exerted upon the brakes of the trailer via the circuit 26.

The pressure in the chamber 35 will always be somewhat higher than the pressure in the chamber 36, and for this reason, the piston element 35 is a stepped element to provide the necessary compensation. But as pointed out earlier, it is also possible to use a non-stepped element and to provide a spring in the chamber 36 which acts upon the element 34 and compensates for the pressure differential between the chambers 35 and 36.

Once pressure disappears in the circuits 5 and 10, or a pressure drop in the chamber 36 is terminated, all movable components return to their starting position and the trailer braking circuit 26 is vented to the ambient atmosphere via the conduit 39.

Figure 3:
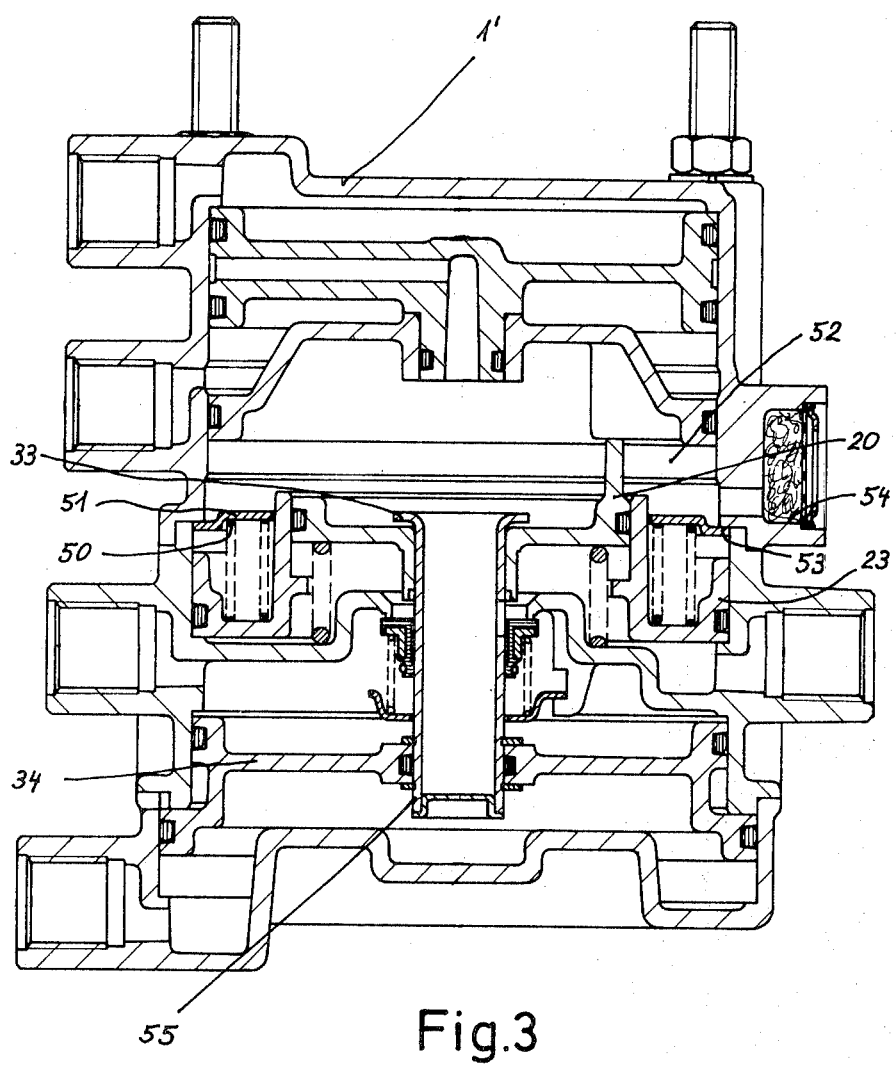
FIG. 3 is a view similar to FIG. 1 but illustrating a further embodiment of the invention.

Coming, finally to the embodiment in FIG. 3, it will be seen that this is largely reminiscent of that in FIG. 1, so that like reference numerals have been used to designate like components to the extent that reference numerals are necessary at all.

The essential difference in FIG. 3 versus the embodiment in FIG. 1 is the fact that the point 46 on a pressure curve plotted in keeping with the operation of the valve unit in FIG. 3, cannot be adjusted as in the embodiment of FIG. 1. In other words, in FIG. 3 the spring 17 is replaced by a spring 50 which is again pre-stressed and abuts against a supporting plate 51 which is fixed and supported against a shoulder 53 of the valve housing 1'. The shoulder 53 is located in a chamber 52 which communicates with the ambient atmosphere. The opposite end of the spring 50 acts upon the piston portion 23 of the compound piston 20, 23. A lateral inlet 54 is provided on the housing 1', communicating with the ambient atmosphere, and the tubular guide 55 which is also provided in this embodiment and replaces the tubular guide 32 of FIG. 1, is substantially shorter than the tubular guide 32. The guide 55 carries the flange 33 and the piston element 34.

The operation of the embodiment in FIG. 3 is the same as that in FIG. 1, except that the point 46 (see FIG. 2) of the trailer braking circuit 26 pressurizing curve is here fixed as a function of the selection of the spring 50, and cannot be adjusted as in FIG. 1. For details of the operation of FIG. 3, reference may be had to the operation of the embodiment in FIG. 1 which, except for the manner in which the pre-stressing of the spring 17 can be varied in that embodiment, is the same. The embodiment of FIG. 3 is of course similar to that of FIG. 1 and may be used in certain applications.

It will be understood that each of the elements described above, or two or more together, may also find a useful application in other types of constructions differing from the types described above.

While the invention has been illustrated and described as embodied in a control valve unit for a pneumatic braking system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features, that from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. In a pneumatic braking system which includes two first pneumatic braking circuits of a motor vehicle and a second pneumatic braking circuit of a trailer towed by the vehicle, a control valve unit for controlling the pressurization of the second braking circuit in dependence upon the pressurization of the first braking circuits, said valve unit comprising a housing having an outlet communicating with said second circuit, and a chamber containing fluid at the pressure of a pressure-fluid reservoir; valve means displaceable between a first position connecting said outlet with the ambient atmosphere, a second position disconnecting said outlet from the ambient atmosphere, and a third position connecting said outlet with said chamber to thereby pressurize said second circuit; a pair of first pistons shiftable in said housing from a rest position to an operated position in response to pressurization of said first circuits during braking of the vehicle; and a compound second piston for controlling the movements of said valve means, said second piston having one piston portion connected with said valve means and shiftable in said housing to displace said valve means sequentially from said first to said second and then toward said third position thereof in response to movement of at least one of said first positions to said operated position, and an other piston portion which is biased away from said one piston portion and which has a surface communicating with the interior of said outlet, so that, when said second circuit is partially pressurized during movement of said valve means from said second towards said third position and pressure in said outlet exceeds the biasing force, said other piston portion moves into abutment with said one piston portion to thereby modify the shifting movement of the same and thus the displacement of said valve means towards said third position.

2. A control valve unit as defined in claim 1, said housing having an additional chamber which communicates with said outlet and which is in part bounded by said second piston and in part by a stationary wall provided with a valve seat of said valve means, said valve seat communicating with the first-mentioned chamber.

3. A control valve unit as defined in claim 2, said valve means further comprising an additional valve seat spaced axially from the first-mentioned valve seat and provided on said one piston portion, and a valve member cooperating with said valve seats.

4. A control valve unit as defined in claim 3; further comprising a tubular guide member extending through said valve seats and said valve member and having an inner end located in said housing and provided with a flange which is engageable with said one piston portion; and a piston element slidably mounted on said guide member and having oppositely directed axial surfaces exposed to the pressure of fluid in said first-mentioned chamber and to the pressure of an emergency brake circuit, respectively.

5. A control valve unit as defined in claim 4, said tubular guide member communicating with the ambient atmosphere and being surrounded by a circumferential sealing lip which is spaced from said additional valve seat, and at least one opening provided in a circumferential wall of said tubular guide member in communication with said additional chamber.

6. A control valve unit as defined in claim 1, wherein said piston portions are telescopable together, and wherein said other piston portion is provided with a shoulder which contacts said one piston portion when said other piston portion moves into abutment with the same.

7. A control valve unit as defined in claim 1, wherein said compound second piston is axially spaced from said first pistons, and said one piston portion is provided with projections which extend toward and are in permanent motion-transmitting engagement with one of said first pistons.

8. A control valve unit as defined in claim 7, said other piston portion being provided with a transverse plate and said one piston portion being partially telescoped into said other piston portion, said plate having cut-outs through which said projections extend into said engagement with said one first piston; and further comprising a prestressed spring bearing upon said plate and providing the biasing force which biases said other piston portion away from said one piston portion.

9. A control valve unit as defined in claim 8; and further comprising adjusting means for adjusting the prestressing of said spring at the will of a user.

10. A control valve unit as defined in claim 9, further comprising a tubular guide member extending through and surrounded by said valve means; and wherein said adjusting means comprises a tension rod freely shiftably extending through said guide member and having an inner end connected with said spring, and an outer end which is connected with a wall of said housing so as to accessible exteriorly of the latter and to be shiftable for adjusting the prestressing of said spring.

11. A control valve unit as defined in claim 1, said housing including an additional chamber which communicates with the ambient atmosphere and is provided with an internal shoulder; an abutment plate supported by said shoulder; and a pre-stressed spring bearing upon said abutment plate and upon said other piston portion so as to provide the biasing force which biases said other piston portion away from said one piston portion.

* * * * *